United States Patent Office 3,346,585
Patented Oct. 10, 1967

3,346,585
DIAZAPOLYMETHINE DYES
Johannes Dehnert, Ludwigshafen (Rhine), Germany, assignor to Badische Anilin- & Soda-Fabrik Aktiengesellschaft, Ludwigshafen (Rhine), Germany
No Drawing. Filed Apr. 12, 1963, Ser. No. 272,529
Claims priority, application Germany, Nov. 30, 1960, B 60,291; June 6, 1961, B 62,786; Apr. 17, 1962, B 66,851; May 19, 1962, B 67,320
The portion of the term of the patent subsequent to Oct. 27, 1981, has been disclaimed
4 Claims. (Cl. 260—305)

This application is a continuation-in-part of application Ser. No. 155,471, filed Nov. 28, 1961, now U.S. Patent 3,154,555.

This invention relates to new dyes of the diazapolymethine series and methods for their production.

Diazapolymethine dyes which dye polyacrylonitrile fibers with good fastness are already known from the literature. There is however a demand for dyes which will give dyeings with better light fastness than the dyes already known.

The dyes according to this invention give dyeings with outstanding light fastness on polyacrylonitrile.

The invention relates to dyes of the general formula:

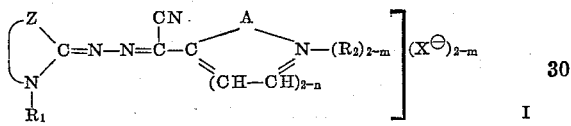

in which A and Z denote divalent radicals which are required to complete a five- or six-membered mononuclear or dinuclear heterocyclic system, $R_1$ denotes a hydrogen atom or an aliphatic, cycloaliphatic or araliphatic radical, $R_2$ denotes an aliphatic, cycloaliphatic or araliphatic radical, X denotes an anion, $m$ denotes one of the numbers 1 and 2 and $n$ denotes one of the numbers 1 and 2.

The invention relates especially to dyes of the Formula I in which

denotes a radical of a heterocyclic compound substituted on the nitrogen atom by $R_1$ and having the skeleton of thiazole, benzothiazole, quinoline, 1,3,4-thiadiazole, 1,2,4-triazole, 1,3,4-oxadiazole, pyrazole, tetrazole, cinnoline, pyridazine or indazole, $R_1$ denotes hydrogen or a methyl, ethyl, chloroethyl, propyl, butyl, cyclohexyl or benzyl radical, $R_2$ denotes methyl, ethyl, chloroethyl, propyl, butyl, cyclohexyl or benzyl, A denotes a connecting member which completes the part of the formula:

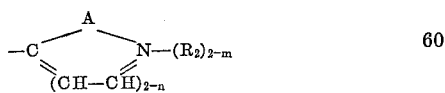

to 1-methyl-, 1-ethyl- and 1-phenylbenzimidazolyl-(2), 1-methyl-, 1-ethyl- and 1-phenyl-5-chlorobenzimidazolyl-(2), benzoxazolyl-(2), benzothiazolyl-(2), pyridyl-(2), pyridyl-(4), quinolyl-(2), quinolyl-(4), 1,3,3-trimethylindolenin-2-yl and 1,3,3-trimethyl-5-chloroindolenin-2-yl, X denotes a colorless anion, $m$ denotes one of the numbers 1 and 2 and $n$ denotes one of the numbers 1 and 2.

Dyes in which $m$ is equal to 1 are preferred.

The divalent radical Z may be, for example, one of the following connecting members, which may also be substituted:

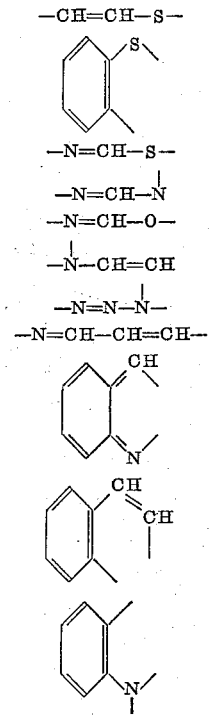

The following connection members A, which may also be substituted, are given by way of example:

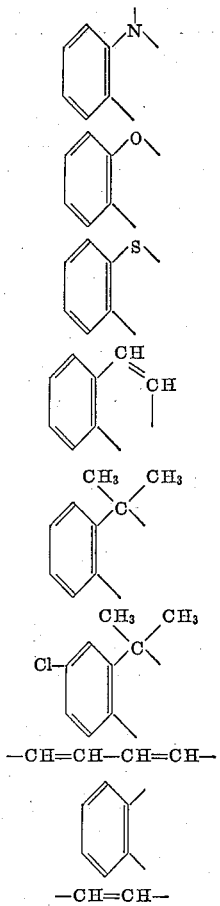

$n$ being equal to two except in the two last cases. The invention is not limited to the connecting members Z and A specified above.

The invention also relates to a process for the production of dyes of the said kind.

These dyes are obtained: (a) by coupling hydrazones or their derivatives of the general formula:

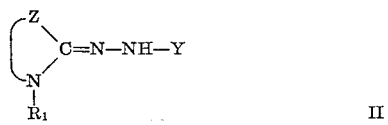

in which Z and $R_1$ have the meanings given above and Y denotes a hydrogen atom or an arylsulfonyl radical in the presence of dehydrogenation or oxidizing agents with compounds of the general formula:

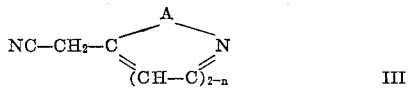

in which A and $n$ have the meanings given above, and if desired treating the coupling products with alkylating agents, or (b) diazotizing amines of the general formula:

in which Z has the meaning given above, coupling the resultant diazotized amines with compounds of the Formula III and if desired treating the coupling products with alkylating agents.

Instead of using coupling components of Formula III there may be used as well compounds of the formula:

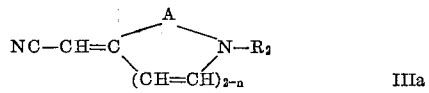

or salts thereof.

Examples of initial materials of the Formula II in which Y denotes hydrogen are: benzothiazolone-2-hydrazone, 3-methylbenzothiazolone - 2 - hydrazone, 6-methoxy-3-methylbenzothiazolone-2 - hydrazone, 1-methylquinolone-2-hydrazone, 5-methylmercapto-3 - methylthiadiazolone-2-hydrazone, 5 - phenylamino-3 - methylthiadiazolone-2-hydrazone and the equivalent compounds substituted on the nitrogen atom in 1 or 3 position of the heterocyclic ring by ethyl, propyl, butyl, cyclohexyl, benzyl or phenyl radicals.

Examples of hydrazones of the Formula II bearing arylsulfonyl groups, i.e. with Y equal to $SO_2TR$, are: 3-methylbenzothiazolone-(2)-N' - benzenesulfonylhydrazone, and 3-methyl-6-methoxybenzothiazolone - (2) - N'-benzenesulfonylhydrazone.

Examples of initial materials of the Formula III are: 2-cyanomethylbenzimidazole, 2-cyanomethyl - 1-phenylbenzimidazole, 2-cyanomethyl-5-chlorobenzimidazole, 2-cyanomethylbenzoxazole, 2 - cyanomethylbenzothiazole, 2-cyanomethylpyridine, 4 - cyanomethylpyridine, 2 - cyanomethylquinoline, and 4-cyanomethylquinoline.

Examples of initial materials of Formula IIIa are: 1,3,3-trimethyl-2 - cyanomethyleneindolin and 1,3,3 - trimethyl-5-chloro - 2 - cyanomethyleneindolin which components yield particularly valuable basic dyestuffs.

Many of these cyanomethyl compounds are known. Cyanomethyl compounds which have not been described may be obtained by methods analogous to those for the known substances; for example 2-cyanomethyl-5-chlorobenzimidazole is obtained by reaction of 4-chloro-1,2-diaminobenzene with cyanoacetic acid esters analogously to the method of preparation of 2-cyanomethylbenzimidazole from 1,2-diaminobenzene.

The coupling of initial materials of Formula II with compounds of Formula III is preferably effected at 0° to 30° C. in the presence of dehydrogenation or oxidizing agents, such as atmospheric oxygen, hydrogen peroxide, hypochlorite, persulfates, perborates, ferric salts, cupric salts, mercuric salts, ceric salts and hexacyanoferrates (III). Water, organic solvents or mixtures of both are suitable as reaction media.

The heterocyclic, diazotizable, preferably five-membered, amines of the said general Formula IV may contain condensed-on rings, for example benzene or naphthalene rings. Especially suitable diazo compounds are the diazotized amines of the heterocyclic compounds: thiazole, benzothiazole, thiadiazole, oxadiazole, pyrazole, triazole, tetrazole, cinnoline, pyridazine and indazole.

The heterocyclic compounds or the ring systems containing heterocyclic rings may be substituted by the conventional substituents for azo dyes, as for example alkyl, alkoxy, aralkyl, aryl, nitro, acyl, acylamino, alkylsulfonyl, sulfonic acid or carboxylic acid amide groups or halogen atoms.

The alkylation of the dyes obtainable by the methods (a) and (b) may be carried out without the use of solvents or in the presence of solvents or diluents, preferably at temperatures between 20° and 160° C., if desired with the addition of acid-binding agents, such as magnesium oxide, sodium methylate, or dimethyl formamide. Dimethyl sulfate, diethyl sulfate, the methyl, ethyl and chloroethyl esters of toluenesulfonic acid, methyl iodide, ethyl iodide, propyl chloride, butyl bromide and benzyl chloride are examples of suitable alkylating agents. Dimethyl sulfate and diethyl sulfate are preferred. Dimethyl sulfate is especially suitable for alkylating the dyes.

By the methods (a) and (b) by using coupling components of Formula III dyes are first obtained having the general formula:

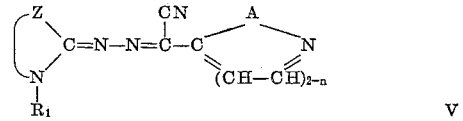

in which $R_1$, Z, A and $n$ have the meanings given above, from which dyes of the formally equivalent Formulae VI(A) and VI(B) are obtained by alkylation:

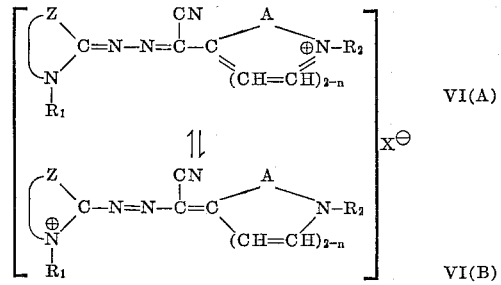

On using coupling components of Formula IIIa only the moiety of the molecule corresponding to the left-hand side of the formula is alkylated.

Formulae VI(A) and VI(B) are resonance formulae and for the sake of simplicity only the Formula VI(A) will hereinafter be used. In the Formulae VI, $R_1$ and $R_2$ denote alkyl radicals, preferably of low molecular weight, for example containing 1 to 4 carbon atoms, cycloalkyl radicals or aralkyl radicals, which may also be substituted, and X denotes an anion, especially a chloride, bromide, iodide, nitrate, perchlorate, sulfate, phosphate, tetrachlorozincate, tetrabromozincate, tetrafluoborate, toluenesulfonate, methosulfate or ethosulfate ion.

These anions are required to neutralize the cationic part of the dye. Their constitution is therefore not of decisive importance as regards the quality of the dye. For technical reasons, inorganic anions are preferred, mainly those derived from monobasic acids. The anions may also be inorganic complexes. Anions which have no color of their own are especially important.

The dyes obtainable according to this invention are water-soluble to a greater or lesser extent depending on the nature of the components used. They are outstandingly suitable in solution or suspension for dyeing and printing textiles, e.g. of mordanted cotton, leather, or such materials, as fibers, flock, threads, filaments, films or spun goods of cellulose esters or ethers or of synthetic substances, such as polyamides, polyurethanes or polyesters. Especially on products of polyacrylonitrile or products of copolymers containing acrylonitrile, the dyes according to this invention give dyeings and prints in pure and very fast shades.

The invention is illustrated by, but not limited to, the following examples in which parts, unless otherwise stated, are by weight. Parts by volume bear the same relation to parts by weight as the liter under standard conditions to the kilogram.

EXAMPLE 1

A solution of 18 parts of 3-methylbenzothiazolone-2-hydrazone in 500 parts of 0.2 M aqueous hydrochloric acid is added, at room temperature, to a suspension of 16 parts of 2-cyanomethylbenzimidazole in 250 parts of water, with stirring and external cooling, and to this mixture 300 parts by volume of aqueous 2 M ferric chloride solution and 250 parts by volume of 50% aqueous sodium acetate solution are allowed to flow simultaneously but separately. The yellow precipitate formed is filtered off by suction, washed with water and dried. A yellow dye of the formula:

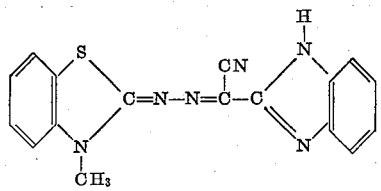

is obtained which dissolves in 80% aqueous acetone with a yellow color and dyes polyamide fibers yellow shades of very good fastness.

By using 21 parts of 6-methoxy-3-methylbenzothiazolone-2-hydrazone instead of 18 parts of 3-methylbenzothiazolone-2-hydrazone, a yellow coupling product with similar tinctorial properties is obtained.

EXAMPLE 2

The dye obtained according to the first paragraph of Example 1 is heated to 50° to 60° C. with 100 parts by volume of chloroform. After adding 10 parts by volume of magnesium oxide and 26 parts by volume of dimethyl sulfate the mixture is stirred at the said temperature until methylation is complete. This may be determined by paper chromatography. The chloroform is distilled off, 3000 parts of 1% aqueous acetic acid being added simultaneously. The methylated dye is precipitated as tetrachlorozincate by adding 20 parts by volume of 50% aqueous zinc chloride solution and 1000 parts by volume of saturated aqueous sodium chloride solution. The precipitate is filtered off by suction, washed with a small amount of water and dried at 70° C. A yellow dye of the formula:

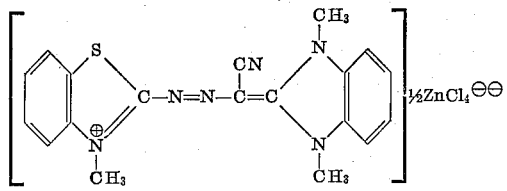

is obtained which dissolves in water with a yellow color and dyes polyacrylonitrile cloth yellow shades from an acetic acid or sulfuric acid bath. Dyeings thus obtained have outstanding wet and light fastness properties. An orange methylation product with similar properties is obtained by using 6-methoxy-3-methylbenzothiazolone-2-hydrazone as the hydrazone component.

EXAMPLE 3

12 parts of 4-cyanomethylpyridine are added to a solution of 21 parts of 6-methoxy-3-methylbenzothiazolone-2-hydrazone in 400 parts of water and 40 parts by volume of concentrated hydrochloric acid, and then 300 parts by volume of a 2 M aqueous ferric chloride solution are gradually added at room temperature. The dye obtained, which is difficultly soluble in the reaction solution, is filtered off by suction, washed with water and dried. A dye of the formula:

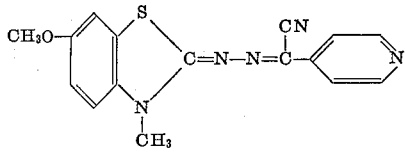

is obtained as a yellow-brown powder which dissolves in 80% aqueous acetone with a yellow color. The dye, when finely dispersed in the dyebath, dyes polycaprolactam cloth fast yellow shades.

By using 12 parts of 2-cyanomethylpyridine as a coupling component, a yellow dye is obtained having similar tinctorial properties.

EXAMPLE 4

The dye of Example 3, paragraph 1, is methylated and processed as described in Example 2. An orange-red zinc chloride double salt of the formula:

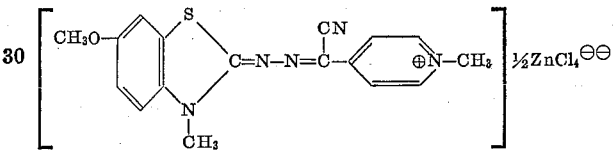

is obtained which dissolves in water with an orange color and dyes polyacrylonitrile filament scarlet-red shades having an outstanding wet and light fastness. The yellow methylation product of the dye of Example 3, paragraph 2, gives yellow shades with similar tinctorial properties.

EXAMPLE 5

A mixture of 100 parts by volume of 1 M aqueous potassium hexacyanoferrate (III) solution, 100 parts by volume of 2 N aqueous caustic soda solution and 200 parts by volume of N-methylpyrrolidone is allowed to flow gradually at room temperature into a solution of 16 parts of 3-methylbenzothiazolone-2-benzenesulfonylhydrazone and 6 parts of 2-cyanomethylpyridine in 200 parts by volume of N-methylpyrrolidone, 100 parts of water and 100 parts by volume of 2 N aqueous caustic soda solution. The dye thus obtained is completely precipitated by adding 1000 parts of water and 50 parts by volume of 30% aqueous acetic acid. The precipitated dye is filtered off, washed with water and dried. The dye obtained has the formula:

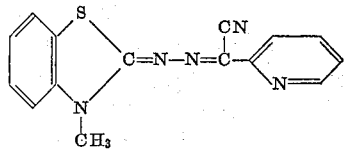

and is a yellow powder. It dissolves in 80% aqueous acetone with a yellow color. In finely dispersed form it dyes polyacrylonitrile cloth yellow shades of very good wet and light fastness from an acetic acid bath.

By using 8 parts of 2-cyanomethylbenzimidazole as a coupling component, the same dye is obtained as in Example 1.

EXAMPLE 6

The dye obtained according to Example 5, paragraph 1, is stirred at 50° to 60° C. with 250 parts by volume of chloroform and 6 parts by volume of dimethyl sulfate until methylation is complete. The chloroform is then removed by distillation, 2000 parts of water being added at the same time. The product settles out completely on adding 1500 parts by volume of saturated aqueous sodium chloride solution. It is filtered off by suction and dried. It is a dye of the formula:

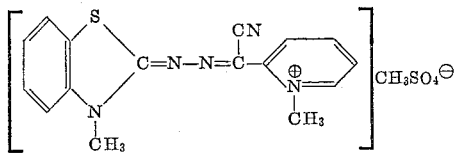

obtained as a yellow powder which dissolves in hot water with a yellow color and dyes cellulose 2½-acetate fast yellow shades.

EXAMPLE 7

35 parts of a 40% solution of nitrosylsulfuric acid in concentrated sulfuric acid is allowed to flow at 0° to 5° C. to a solution of 15 parts of 1-aminobenzothiazole in 100 parts of 60% sulfuric acid and the mixture is stirred for another three hours at this temperature.

The diazo solution is then added by small portions to a suspension of 16 parts of 2-cyanomethylbenzimidazole in 500 parts of water and 500 parts of ice at 0° to 5° C. The water-insoluble azo dye thus formed is filtered off by suction and washed free from acid. After drying, a dye of the formula:

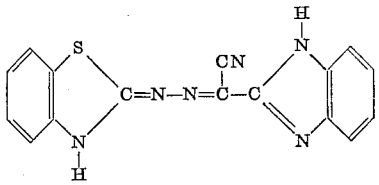

is obtained as a yellow powder which dissolves in dimethylformamide with a yellow color and dyes polyamide cloth fast yellow shades.

EXAMPLE 8

The total amount of the dry dye obtained by the manner described in Example 7 is heated to 60° C. with 1000 parts by volume of chloroform. 5 parts of magnesium oxide and 35 parts by volume of dimethyl sulfate are added, the mixture then being stirred at 60° C. until methylation is complete. This can readily be determined for example by paper chromatography. 3000 parts by volume of 0.5% aqueous acetic acid are then allowed to flow to the reaction mixture, chloroform being distilled off at the same rate. The product is filtered while still hot and to the hot filtrate 1000 parts by volume of a saturated aqueous sodium chloride solution are added slowly. After cooling, the product is filtered off by suction, washed with a small amount of water and dried. An orange dye of the formula:

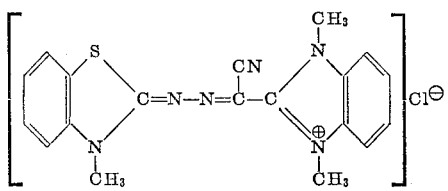

is obtained in the form of a powder which dissolves in hot water with a yellow color and dyes polyacrylonitrile fibers yellow shades of outstanding light and wet fastness from an acetic acid or sulfuric acid bath.

The following dyes are obtained in an analogous manner:

| Example | | Shade of dyeing on polyacrylonitrile cloth |
|---|---|---|
| 9 | [structure] CH₃SO₄⁻ | Yellow. |
| 10 | [structure] Br⁻ | Orange. |
| 11 | [structure] ClO₄⁻ | Scarlet. |
| 12 | [structure] BF₄⁻ | Orange. |
| 13 | [structure] CH₃—⟨⟩—SO₃⁻ | Yellow. |

EXAMPLE 14

35 parts of a 40% solution of nitrosylsulfuric acid in concentrated sulfuric acid is added at 0° to 5° C. to a solution of 15 parts of the nitrate of 2-amino-5-phenyl-1,3,4-thiadiazole in 200 parts of concentrated sulfuric acid and 80 parts of water and after standing for three hours the diazotization mixture is run, at 0° to 5° C., into a suspension of 16 parts of 2-cyanomethylbenzimidazole in 500 parts of water and 500 parts of ice.

When coupling is complete, the product is filtered off by suction, washed well and dried. A dye of the formula:

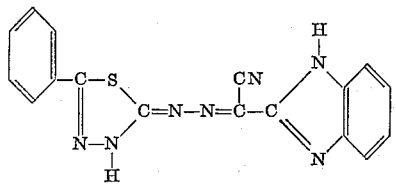

is obtained in the form of a brown-yellow powder which dissolves in dimethylformamide with a yellow color and dyes polyamide cloth fast yellow shades.

EXAMPLE 15

The total amount of dye obtained by the manner described in Example 14 is stirred at 60° C. with 500 parts of chloroform, 5 parts of magnesium oxide and 25 parts of dimethyl sulfate until the dye can no longer be identified. The chloroform is then distilled off, 3000 parts of water and 50 parts of 30% aqueous acetic acid being added at the same time. After filtering the aqueous solution, the dye is precipitated by adding 25 parts by volume of 50% aqueous zinc chloride solution and 1000 parts by volume of a saturated aqueous sodium chloride solution. The product is filtered off by suction and washed with dilute aqueous sodium chloride solution. After drying, the dye of the formula:

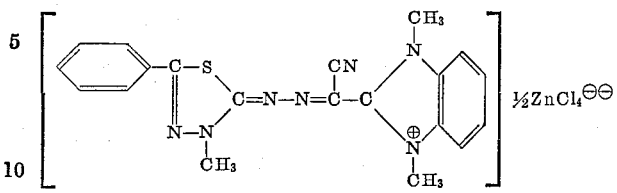

is obtained as a yellow ochre-colored powder which dissolves in hot water with a yellow color and dyes polyacrylonitrile flock yellow shades of outstanding fastness.

With the procedure being the same as in this example and 2-amino-5-phenylthiadiazole and 3-amino-5-phenyl-1,2,4-triazole being used as diazo components, 2-cyanomethylpyridine, 4-cyanomethylpyridine or 2-cyanomethylbenzimidazole being used as coupling components and diethyl sulfate being used as an alkylating agent, the following dyes are obtained:

| Example | Dye | Shade of dyeing on polyacrylonitrile |
|---|---|---|
| 16 | | Yellow. |
| 17 | | Orange. |
| 18 | | Yellow. |
| 19 | | Do. |

EXAMPLE 20

A fabric of polyacrylonitrile staple fiber is placed in a dyebath of 60° C. which contains 2 parts of 96% sulfuric acid, 20 parts of Glauber's salt and 0.6 part of the dye obtained according to Example 2 in 4000 parts of water the temperature then being raised to 85° C. within fifteen minutes. The bath is brought to the boil in the course of another thirty minutes and dyeing is continued in the boiling bath for ninety minutes. The fabric is then soaped, rinsed and dried. The dyeing thus obtained has a very pure yellow shade with an outstanding light and wet fastness.

EXAMPLE 21

100 parts of fibers of a copolymer derived from 40 parts of acrylonitrile and 60 parts of vinyl chloride is dyed at 85° C. in a dyebath containing in 3000 parts of water 5 parts of 30% acetic acid, 3 parts of the condensation product of 1 mole of sperm oil alcohol and 24 moles of ethylene oxide and 0.4 part of the dye obtained in Example 15. The fibrous material is dyed a pure yellow. The dyeing has outstanding light and wet fastness.

EXAMPLE 22

100 parts of a fabric of cellulose 2½-acetate is dyed for sixty minutes at 80° C. in a bath of 3000 parts of water, 1.5 parts of the coupling product of Example 1 and 3 parts of the reaction product of 1 mole of castor oil and 40 moles of ethylene oxide. The dyeing obtained has a brilliant greenish-yellow shade and outstanding light and wet fastness.

EXAMPLE 23

A solution of 18 parts of 3-methylbenzothiazolone-2-hydrazone in 500 parts of 0.2-molar aqueous hydrochloric acid, 250 parts by volume of an aqueous 2-molar ferric chloride solution and 375 parts by volume of a 50% aqueous sodium acetate solution are allowed to flow simultaneously but separately at room temperature during the course of forty to sixty minutes into an ice-cooled solution of 20 parts of 1,3,3-trimethyl-2-cyanomethyleneindoline in 40 parts by volume of dimethylformamide and 500 parts by volume of ethanol while stirring. About two hours later, 2000 parts by volume of saturated sodium chloride solution and 100 parts by volume of 36% hydrochloric acid are added to the resultant mixture, the precipitate is filtered off by suction, washed with dilute sodium chloride solution and dried at 80° C. under subatmospheric pressure. Small proportions of unreacted 1,3,3-trimethyl-2-cyanomethylene indoline are dissolved out by treatment with cyclohexane. The red brown powder obtained is a dyestuff of the formula:

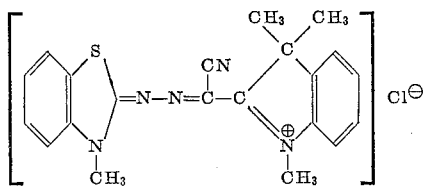

which dissolves in hot water with a red color and dyes polyacrylonitrile fibers from an acetic acid or sulfuric acid dye liquor bright red shades which are outstandingly light and wet fast.

By using 21 parts of 6-methoxy-3-methylbenzothiazolone-2-hydrazone instead of 18 parts of 3-methylbenzothiazolone-2-hydrazone, a violet coupling product is obtained which dyes polyacrylonitrile fibers fast red violet shades.

Coupling products having similar tinctorial properties are obtained by using the following hydrazone components and cyanomethylene bases or their quaternary ammonium compounds.

solution is then slowly introduced into a solution of 21.8 parts of 1,3,3-trimethyl-2-cyanomethyleneindoline in 100 parts of 60% sulfuric acid while cooling externally, 500 parts of ice is added within an hour and the dye formed is filtered off by suction. The dried product, an orange red powder, dissolves in dimethylformamide with a yellow color and dyes polyamides in fast reddish yellow shades.

EXAMPLE 28

The total amount of dry dye obtained acording to Example 27 is heated at 60° C. with 1000 parts by volume of chloroform. Then 5 parts of magnesium oxide and 35 parts by volume of dimethyl sulfate are added and the mixture is stirred at 60° C. until complete methylation has taken place, this being determined for example by paper chromatography. 3000 parts by volume of 0.5% aqueous acetic acid is allowed to flow into the reaction mixture and the chloroform is distilled off at the same rate. The whole is filtered hot and to the hot filtrate 1000 parts by volume of saturated sodium chloride solution is added by small portions and the whole allowed to cool gradually. The deposited dye is filtered off by suction, washed with a little dilute sodium chloride solution and dried. A violet powder is obtained which dissolves in hot water with a red color and dyes polyacrylonitrile fibers from an acetic acid or sulfuric acid liquor in bright red shades which have outstanding light fastness and wet fastness.

The dyestuff obtained is identical with that obtained according to Example 23.

EXAMPLE 29

35 parts of a 40% solution of nitrosylsulfuric acid in concentrated sudfuric acid is allowed to flow at 0° to 5° C. into a solution of 18 parts of 6-methoxy-2-aminobenzothiazole in 100 parts of 60% sulfuric acid and the mixture is stirred for another three hours at 0° to 5° C. Then the mixture is introduced into a solution of 21.8 parts of 1,3,3-trimethyl-2-cyanomethyleneindoline in 100 parts of 60% sulfuric acid while cooling and about an hour later the pH value is adjusted to 7 with caustic soda solution. The deposited product is filtered off by suction, washed with water and dried. The red brown dye obtained dissolves in dimethylformamide with a red color and dyes polyamide cloth fast scarlet shades.

EXAMPLE 30

The total amount of the dye obtained according to Example 29 is quaternized by the method described in Example 28 and the product is isolated. A violet lustrous powder is obtained which dissolves in hot water with a red violet color and dyes polyacrylonitrile fibers clear red violet shades of outstanding light fastness and wet fastness from an acetic acid or sulfuric acid dye liquor.

By using 19.5 parts of 6-ethoxy-2-aminobenzothiazole instead of 18 parts of 6-methoxy-2-aminobenzothiazole as in Example 29 and methylating the resultant dye by

| Example No. | Hydrazone component | Cyanomethylene base | Shade of dyeing of coupling product on polyacrylonitrile |
|---|---|---|---|
| 24 | 3-methylbenzothiazolone-2-hydrazone. | 1,3,3-trimethyl-5-chloro-2-cyanomethylene indoline. | Red. |
| 25 | 6-methoxy-3-methylbenzothiazolone-2-hydrazone. | 1,3,3-trimethyl-5-chloro-2-cyanomethylene indoline. | Red violet. |
| 26 | 5-phenylamino-3-methylthiadiazolone-2-hydrazone. | 1,3,3-trimethyl-2-cyanomethylene indoline. | Claret. |

EXAMPLE 27

35 parts of a 40% solution of nitrosylsulfuric acid in concentrated sulfuric acid is allowed to flow at 0° to 5° C. into a solution of 15 parts of 2-aminobenzothiazole in 100 parts of 60% sulfuric acid and the mixture is stirred for another three hours at this temperature. The diazo the method described in Example 28, a red violet methylation product is obtained having similar tinctorial properties.

EXAMPLE 31

15 parts of 2-aminobenzothiazole is diazotized by the method described in Example 27. The diazo solution is then slowly introduced into a solution of 25.6 parts of 1,3,3-trimethyl-5-chloro-2-cyanomethyleneindoline in 100 parts of 60% sulfuric acid while cooling. About one hour later, 500 parts of ice is added, the solution is neutralized with caustic soda solution and the dye formed is filtered off by suction. The dried product, an orange powder, dissolves in dimethylformamide and dyes polyester cloth fast reddish yellow shades.

EXAMPLE 32

The total amount of dye obtained by the method described in Example 31 is methylated as described in Example 28 and the product is isolated. A dark red powder is obtained which dissolves in hot water and dyes polyacrylonitrile cloth fast bright red shades.

EXAMPLE 33

35 parts of a 40% solution of nitrosylsulfuric acid in concentrated sulfuric acid is allowed to flow at 0° to 5° C. in the course of an hour into a solution of 10 parts of 2-aminothiazole in 100 parts of 60% sulfuric acid and the mixture is stirred at this temperature for another three hours. The diazo solution is then slowly introduced into a solution of 21.8 parts of 1,3,3-trimethyl-2-cyanomethyleneindoline in 100 parts of 60% sulfuric acid while cooling, 500 parts of ice is added about an hour later, the solution is neutralized with caustic soda solution and the dye formed is filtered off by suction. The dried product, a reddish yellow powder, dissolves in dimethylformamide with a yellow color and dyes acetate cloth fast yellow shades.

EXAMPLE 34

The total amount of the dye obtained according to Example 33 is methylated by the manner described in Example 28 and the product is isolated. A red powder is obtained which dissolves in hot water with a red color and dyes polyacrylonitrile cloth very fast pure scarlet shades.

EXAMPLE 35

16.5 parts of 3-amino-6-chloroindazole are diazotized and coupled with 21.8 parts of 1,3,3-trimethyl-2-cyanomethyleneindoline by the manner described in Example 27 when the product is isolated. The dried dye is a yellow powder which dissolves in dimethylformamide with a yellow color.

EXAMPLE 36

The total amount of the dye obtained according to Example 35 is methylated by the manner described in Example 28 and isolated. A brownish powder is obtained which dissolves in hot water with a red color and dyes polyacrylonitrile cloth fast scarlet shades.

EXAMPLE 37

30 parts of 23% sodium nitrite solution and 50 parts of ice are added all at once to a solution of 12.8 parts of 3-aminotriazole carboxylic acid-(5) in 11 parts of 40% caustic soda solution and 200 parts of water, and at 0° to 2° C. 40 parts of 36% hydrochloric acid is allowed to flow in beneath the surface of the liquid. The mixture is stirred for five minutes at the said temperature, the excess nitrite is removed with urea and the diazo solution is added to a solution of 21.8 parts of 1,3,3-trimethyl-2-cyanomethyleneindoline in 100 parts of 60% sulfuric acid. In the course of an hour a pH value of 4 to 5 is set up by adding sodium acetate solution and the dye formed is filtered off by suction and washed. A yellow product is obtained which dissolves in dimethylformamide with a yellow color.

EXAMPLE 38

The total amount of dye obtained according to Example 37 is methylated by the manner described in Example 28 and the product isolated. A brownish powder is obtained which dissolves in hot water and dyes polyacrylonitrile cloth from an acetic acid or sulfuric acid dye liquor yellow shades of outstanding fastness.

EXAMPLE 39

18 parts of 2-amino-5-phenylthiadiazole is diazotized in strong sulfuric acid with nitrosylsulfuric acid and coupled with 21.8 parts of 1,3,3-trimethyl-3-cyanomethyleneindoline as described in Example 33. An orange powder is obtained which dissolves in dimethylformamide with a yellow color and dyes polyamide cloth fast orange shades.

EXAMPLE 40

The total amount of the dye obtained according to Example 39 is methylated by the manner described in Example 28 and the product is isolated. A brownish powder is obtained which dissolves in hot water and dyes polyacrylonitrile cloth fast scarlet shades.

EXAMPLE 41

35 parts of a 40% solution of nitrosylsulfuric acid in concentrated sulfuric acid is added by small portions to a solution of 22.3 parts of 3-amino-5-phenyl-1,2,4-triazolium nitrate in 320 parts of concentrated sulfuric acid and 80 parts of water in the course of an hour at 0° C. and the solution is stirred at this temperature for another three hours. The excess of nitrite is removed with urea and the diazotization mixture is introduced into a solution of 21.8 parts of 1,3,3-trimethyl-2-cyanomethyleneindoline in 100 parts of 60% sulfuric acid, 500 parts of ice is added, the pH value adjusted to 4 to 5 by means of sodium acetate solution and the dye formed is isolated. The dried powder is pale yellow in color and dissolves in dimethylformamide with a pale yellow color.

EXAMPLE 42

The total amount of the dye obtained according to Example 41 is methylated by the manner described in Example 28 and the product is isolated. A yellow powder is obtained which dissolves in hot water and dyes polyacrylonitrile cloth fast yellow shades.

I claim:
1. A dye of the formula:

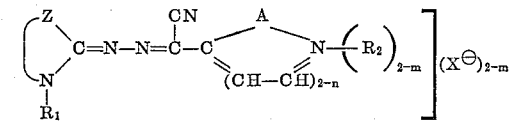

in which

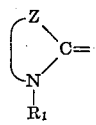

denotes a radical selected from the class consisting of thiazole, benzothiazole, quinoline, 1,3,4-thiadiazole, 1,2,4-triazole, 1,3,4-oxadiazole, pyrazole, tetrazole, cinnoline, pyridazine and indazole and the same heterocyclic radicals having an azo dye substituent selected from the class consisting of alkyl, alkoxy, aralkyl, aryl, nitro, acyl, acylamino, alkylsulfonyl, sulfonic acid amide, carboxylic acid amide and halogen, $R_1$ denotes a radical selected from the class consisting of hydrogen, methyl, ethyl, chloroethyl, propyl, butyl, cyclohexyl and benzyl, $R_2$ denotes a radical selected from the class consisting of methyl, ethyl, chloroethyl, propyl, butyl, cyclohexyl and benzyl, A denotes a linking member which makes up the part of the formula:

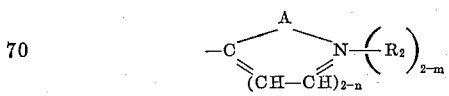

to a radical selected from the class consisting of 1,3,3-trimethylindolenine - 2 - yl and 1,3,3-trimethyl-5-chloroindolenine-2-yl, X denotes a colorless anion, m denotes one of the numbers 1 and 2 and $n$ denotes one of the numbers 1 and 2.
2. The dye of the formula:
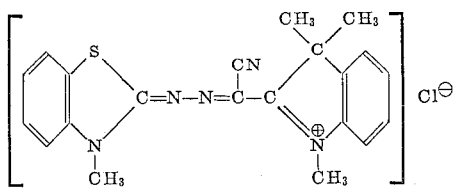
3. The dye of the formula:
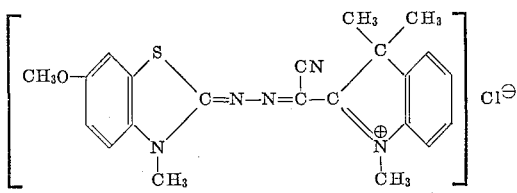
4. The dye of the formula:
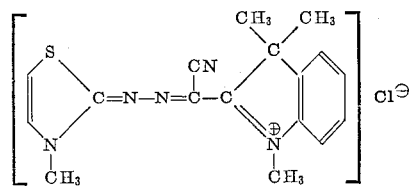
References Cited
UNITED STATES PATENTS
3,154,555  10/1964  Dehnert _____ 260—294.8
FOREIGN PATENTS
610,662  5/1962  Belgium.
640,320  4/1962  Canada.
808,308  2/1959  Great Britain.
JOHN D. RANDOLPH, *Primary Examiner.*